United States Patent
Pilling

(10) Patent No.: US 12,136,804 B2
(45) Date of Patent: Nov. 5, 2024

(54) TERMINATION ARRANGEMENT FOR AN OVERHEAD ELECTRICAL CABLE

(71) Applicant: CTC Global Corporation, Irvine, CA (US)

(72) Inventor: Douglas A. Pilling, Bonita, CA (US)

(73) Assignee: CTC Global Corporation, Irvine, CA (US)

(*) Notice: Subject to any disclaimer, the term of this patent is extended or adjusted under 35 U.S.C. 154(b) by 0 days.

(21) Appl. No.: 16/521,580

(22) Filed: Jul. 24, 2019

(65) Prior Publication Data

US 2020/0194989 A1 Jun. 18, 2020

Related U.S. Application Data

(63) Continuation-in-part of application No. PCT/US2019/014986, filed on Jan. 24, 2019.

(Continued)

(51) Int. Cl.
*H02G 7/05* (2006.01)
*H01B 5/10* (2006.01)
(Continued)

(52) U.S. Cl.
CPC ............ *H02G 7/056* (2013.01); *H01B 5/102* (2013.01); *H01R 11/12* (2013.01); *H02G 1/02* (2013.01);
(Continued)

(58) Field of Classification Search
CPC .......... H02G 7/00; H02G 7/056; H02G 15/06; H02G 15/18; H01B 5/102
See application file for complete search history.

(56) References Cited

U.S. PATENT DOCUMENTS 2,161,423 A * 6/1939 McConnell ............ H02G 15/18
403/275
3,468,119 A * 9/1969 Tatsuo ................. D07B 1/0693
57/223
(Continued)

FOREIGN PATENT DOCUMENTS

CN 1894827 A 1/2007
CN 103534763 A 1/2014
(Continued)

OTHER PUBLICATIONS

International Search Report and Written Opinion dated Apr. 12, 2019 for International Patent Application No. PCT/US2019/014986.

(Continued)

*Primary Examiner* — Paresh Paghadal
(74) *Attorney, Agent, or Firm* — David F. Dockery; The Navitas Intellectual Property Group LLC

(57) ABSTRACT

A termination arrangement for securing an overhead electrical cable to a dead-end structure such as a dead-end tower. The termination arrangement includes a compression sheath structure that is configured to be disposed over the individual composite rods of the strength member. The compression sheath structure mitigates damage to the strength member that may occur when an outer metallic sleeve is compressed around the conductive strands and the conductive strands are compressed against the strength member. The arrangement is particularly useful for securing overhead electrical cables having a composite strength member to a dead-end structure.

16 Claims, 12 Drawing Sheets

Related U.S. Application Data

(60) Provisional application No. 62/621,173, filed on Jan. 24, 2018.

(51) Int. Cl.
| | |
|---|---|
| *H01R 11/12* | (2006.01) |
| *H02G 1/02* | (2006.01) |
| *H02G 7/00* | (2006.01) |
| *H02G 15/06* | (2006.01) |
| *H02G 15/18* | (2006.01) |

(52) U.S. Cl.
CPC .............. *H02G 7/00* (2013.01); *H02G 15/06* (2013.01); *H02G 15/18* (2013.01)

(56) References Cited

U.S. PATENT DOCUMENTS

| | | | | |
|---|---|---|---|---|
| 3,773,501 A | * | 11/1973 | Nakajima | C22C 21/003 |
| | | | | 148/439 |
| 5,554,826 A | * | 9/1996 | Gentry | H01B 5/104 |
| | | | | 174/128.1 |
| 5,711,143 A | * | 1/1998 | Munakata | H01B 5/104 |
| | | | | 57/215 |
| 6,015,953 A | | 1/2000 | Tosaka et al. | |
| 6,323,251 B1 | | 11/2001 | Perez et al. | |
| 6,805,596 B2 | | 10/2004 | Quesnel et al. | |
| 7,060,326 B2 | | 6/2006 | Hiel et al. | |
| 7,131,308 B2 | * | 11/2006 | McCullough | B21C 23/30 |
| | | | | 72/258 |
| 7,348,489 B2 | | 3/2008 | Chadbourne | |
| 7,368,162 B2 | | 5/2008 | Hiel et al. | |
| 7,385,138 B2 | | 6/2008 | France et al. | |
| 7,462,781 B2 | * | 12/2008 | Varkey | H01B 7/046 |
| | | | | 174/102 R |
| 7,563,983 B2 | | 7/2009 | Bryant | |
| 8,525,033 B2 | * | 9/2013 | Grether | D07B 1/0673 |
| | | | | 174/128.1 |
| 8,895,856 B2 | | 11/2014 | McCullough et al. | |
| 9,012,781 B2 | | 4/2015 | Daniel et al. | |
| 9,490,050 B2 | * | 11/2016 | Lancaster | H01B 5/102 |
| 9,685,257 B2 | * | 6/2017 | Daniel | H01B 3/427 |
| 9,748,670 B1 | | 8/2017 | Quesnel | |
| 10,690,839 B2 | * | 6/2020 | Lee | G02B 6/0055 |
| 2003/0145936 A1 | * | 8/2003 | Hrycyk | D07B 7/165 |
| | | | | 156/136 |
| 2003/0194916 A1 | * | 10/2003 | Quesnel | H02G 7/056 |
| | | | | 439/784 |
| 2004/0132366 A1 | | 7/2004 | Hiel et al. | |
| 2004/0182597 A1 | * | 9/2004 | Smith | H01B 5/105 |
| | | | | 174/126.1 |
| 2005/0181228 A1 | * | 8/2005 | McCullough | C22C 47/025 |
| | | | | 428/293.1 |
| 2006/0084327 A1 | | 4/2006 | Chadbourne | |
| 2007/0066153 A1 | | 3/2007 | France et al. | |
| 2008/0128155 A1 | * | 6/2008 | Guery | H01B 3/427 |
| | | | | 174/130 |
| 2008/0233787 A1 | | 9/2008 | Geibel et al. | |
| 2009/0114419 A1 | * | 5/2009 | Park | H01B 5/10 |
| | | | | 174/113 R |
| 2010/0038112 A1 | * | 2/2010 | Grether | H01B 13/0006 |
| | | | | 174/128.1 |
| 2010/0243320 A1 | | 9/2010 | Bryant et al. | |
| 2011/0297441 A1 | | 12/2011 | Quesnel | |
| 2012/0090892 A1 | | 4/2012 | Meyer et al. | |
| 2012/0174557 A1 | * | 7/2012 | Boisseau | D07B 1/165 |
| | | | | 57/213 |
| 2012/0261158 A1 | * | 10/2012 | Daniel | H01B 3/427 |
| | | | | 174/102 R |
| 2012/0305312 A1 | | 12/2012 | McCullough et al. | |
| 2014/0295057 A1 | * | 10/2014 | Ryabova | C23C 18/00 |
| | | | | 427/8 |
| 2015/0075837 A1 | | 3/2015 | Welborn et al. | |
| 2015/0308904 A1 | * | 10/2015 | Shu | G02B 6/4429 |
| | | | | 374/161 |
| 2016/0099090 A1 | | 4/2016 | Huang | |
| 2017/0288383 A1 | * | 10/2017 | Quesnel | H02G 1/14 |
| 2018/0226174 A1 | | 8/2018 | Rose | |
| 2019/0288497 A1 | * | 9/2019 | Nakamura | H01R 4/20 |
| 2019/0363461 A1 | * | 11/2019 | Boudreau | H01R 4/10 |
| 2020/0194989 A1 | | 6/2020 | Pilling | |

FOREIGN PATENT DOCUMENTS

| | | | | | |
|---|---|---|---|---|---|
| CN | 105719768 | A | * | 6/2016 | ............ H01B 1/02 |
| CN | 106024135 | A | * | 10/2016 | ........... C08F 220/06 |
| EP | 1821318 | A2 | | 8/2007 | |
| EP | 3203584 | A1 | | 8/2017 | |
| JP | H03129606 | A | | 6/1991 | |
| JP | H0583931 | U | | 11/1993 | |
| JP | H07250418 | A | | 9/1995 | |
| JP | 2005523569 | A | | 8/2005 | |
| JP | 2007525796 | A | | 9/2007 | |
| JP | 2009509313 | A | | 3/2009 | |
| JP | 2013520769 | B2 | | 6/2013 | |
| JP | 2014517092 | A | | 7/2014 | |
| JP | 2017135786 | A | | 8/2017 | |
| JP | 6201042 | B2 | | 9/2017 | |
| KR | 20190037592 | A | | 4/2019 | |
| NZ | 546771 | A | | 2/2011 | |
| WO | WO-2014200388 | A2 | * | 12/2014 | ............. H01B 7/28 |
| WO | WO-2015066889 | A1 | * | 5/2015 | ............ H02G 15/02 |
| WO | 2015170389 | A1 | | 11/2015 | |
| WO | WO-2015194221 | A1 | * | 12/2015 | ............ D07B 1/147 |
| WO | 2017130928 | A1 | | 8/2017 | |
| WO | 2019147838 | A1 | | 8/2019 | |

OTHER PUBLICATIONS

International Search Report and Written Opinion dated Jan. 19, 2021 for International Patent Application No. PCT/US2020/043526.
Office Action dated Apr. 16, 2021 for Eurasian Patent Application No. 202091770.
Office Action dated Apr. 3, 2021 for Sri Lankan Patent Application No. 21248.
Extended European Search Report dated Sep. 23, 2021 for European Patent Application No. 19743339.4.
Notice of Allowance dated Jul. 28, 2021 for U.S. Appl. No. 16/961,358.
Office Action dated Aug. 16, 2021 for Chilean Patent Application No. 1952-2020.
Office Action dated Jul. 28, 2021 for Canadian Patent Application No. 3,088,407.
Search Report issued in Panama Patent Application No. 93147-01 dated Jul. 7, 2021.
Office Action dated Oct. 25, 2021 for Eurasian Patent Application No. 202091770.
Notice of Allowance dated Jan. 18, 2022 for U.S. Appl. No. 16/961,358.
Office Action dated Oct. 14, 2022 for Brazilin Patent Application No. BR 11 2020 015181.
Office Action dated Aug. 12, 2022 for Indonesian Patent Application No. P00202006045.
Office Action dated Feb. 23, 2022 for Indian Patent Application No. 202017035981.
Office Action dated Mar. 29, 2022 for Chinese Patent Application No. 201980015086.6.
Office Action dated May 3, 2022 for Chilean Patent Application No. 1952-2020.
Office Action dated Oct. 18, 2022 for Japanese Patent Application No. 2020-561595.
Office Action and Search Report dated Sep. 4, 2023 for ARIPO Patent Application No. AP/P/2020/012558.
Office Action dated Apr. 23, 2023 for Chinese Patent Application No. 201980015086.6.

(56) References Cited

OTHER PUBLICATIONS

Office Action dated Apr. 27, 2021 for Eurasian Patent Application No. 202091770.
Office Action dated Aug. 31, 2023 for Mexican Patent Application No. MX/a/2020/007879.
Office Action dated Feb. 1, 2024 for New Zealand Patent Application No. 766508.
Office Action dated Feb. 15, 2024 for Malaysian Patent Application No. PI2020003749.
Office Action dated Jan. 11, 2023 for Canadian Patent Application No. 3,088,407.
Office Action dated Jan. 16, 2024 for South Korean Patent Application No. 10-2020-7024191.
Office Action dated Jun. 1, 2023 for European Patent Application No. 19743339.4.
Office Action dated Jun. 21, 2023 for Vietnamese Patent Application No. 1-2020-04830.
Office Action dated Nov. 10, 2023 for Australian Patent Application No. 2019212363.
Office Action dated Nov. 28, 2023 for Chinese Patent Application No. 201980015086.6.
Office Action dated Sep. 26, 2023 for Saudi Arabian Patent Application No. 520412486.

\* cited by examiner

TERMINATION ARRANGEMENT FOR AN OVERHEAD ELECTRICAL CABLE

CROSS-REFERENCE TO RELATED APPLICATIONS

This application claims the priority benefit as a continuation-in-part application of International Application PCT/US2019/014986, filed on Jan. 24, 2019, which claims the priority benefit of U.S. Provisional Application No. 62/621,173 filed on Jan. 24, 2018. The disclosure of each of these applications is incorporated herein by reference in its entirety.

FIELD

This disclosure relates to the field of overhead electrical cables, and in particular relates to structures and methods for the termination of overhead electrical cables having a multi-element composite strength member, such as termination at a dead-end structure.

BACKGROUND

In the construction of an overhead electrical transmission and/or distribution line, the overhead electrical cable that transmits the electricity is strung upon support towers along the length of the line. The overhead electrical cable typically includes one or more conductive layers that each include of a plurality of individual conductive strands that are wrapped around and are supported by a strength member. The strength member is necessary because the conductive strands do not have sufficient mechanical properties (e.g., tensile strength) to be self-supporting when strung between the support towers. Traditionally, the conductive strands are fabricated from aluminum or an aluminum alloy and the strength member is fabricated from steel, specifically several independent steel elements that are combined (e.g., twisted together) to form the strength member, a configuration referred to as ACSR (aluminum conductor steel reinforced).

In recent years, the steel strength member has been replaced by advanced composite materials for some installations. The advanced composite materials include two or more distinct material phases, such as structural fibers in a binding matrix, that combine to enhance one or more properties of the strength member. Some of these composite materials offer significant benefits as compared to steel, including higher tensile strength, lower coefficient of thermal expansion, resistance to corrosion and the like.

One example of an overhead electrical cable having such a composite strength member is the ACCC® overhead electrical cable available from CTC Global Corporation of Irvine, CA, USA. See, for example, U.S. Pat. No. 7,368,162 by Hiel et al, which is incorporated herein by reference in its entirety. The ACCC® electrical cable includes a plurality of conductive aluminum strands surrounding a single-element (e.g., single rod) fiber-reinforced composite strength member. The composite strength member includes an inner core of continuous carbon fibers in a polymer (e.g., resin) binding matrix, surrounded by an outer layer of continuous glass fibers in the binding matrix.

When constructing electrical transmission and distribution lines, the electrical cable must be frequently terminated, such as for connection to another segment of electrical cable, for drop down to a power station, or for drop down to an underground cable. In these cases, the electrical cable is terminated and attached to a dead-end structure (e.g., a dead-end tower) using termination hardware. Often, the termination hardware requires crimping of an outer conductive metal sleeve onto the electrical cable using very high compressive forces to deform the metal outer sleeve.

Some fiber-reinforced composite strength member configurations include multiple individual composite elements (e.g., individual composite rods) that are operatively combined to form the strength member. When an overhead electrical cable having such a strength member configuration is compressed during termination of the electrical cable, the compressive forces are transferred to the underlying composite strength member, i.e., are transferred onto the individual strength elements. Due to the relatively low ductility of the composite material and due to the point-to-point contact among the individual composite rods, cracking of the composite rods under the compressed area may occur.

SUMMARY

Disclosed herein is a termination arrangement that, when used to terminate and overhead electrical cable having a strength member of multiple composite rods reduces localized pressure on the composite strength member during crimping operations to reduce or eliminate cracking of the composite rods. The termination arrangement includes a compression sheath structure that is placed over the individual composite rods in the area where the outer housing is compressed over the conductive strands. The compression sheath structure may remain within the termination arrangement for the life of the connection. The compression sheath structure may be composed of individual cylindrical tubes, or may be composed of a unitary body having a plurality of apertures extending therethrough to receive the individual composite rods.

In one embodiment, a termination arrangement securing an overhead electrical cable to a dead-end structure is disclosed. The overhead electrical cable includes a composite strength member comprising a plurality of individual composite rods that are operatively combined to form the composite strength member and having conductive strands surrounding the composite strength member. The termination arrangement includes a connector anchoring the termination arrangement to a dead-end structure and an outer metallic sleeve surrounding the proximal end of the overhead electrical cable, the outer metallic sleeve having a compressed portion disposed over the proximal end of the overhead electrical cable. A compression sheath structure is disposed between at least the individual composite rods along at least the length of the conductive strands under the compressed portion.

The foregoing termination arrangement may be characterized as having further refinements and/or additional features, which may be implemented alone or in any combination. For example, in one refinement, the individual composite rods of the strength member comprise reinforcing fibers disposed within a binding matrix. The binding matrix may be a metallic matrix or may be a polymeric matrix. The polymeric matrix may include a polymer selected from a thermoset resin polymer and a thermoplastic polymer. The reinforcing fibers may include fibers selected from the group consisting of carbon fibers, boron fibers, metal oxide ceramic fibers, glass fibers, carbide fibers, aramid fibers and basalt fibers. In one particular refinement, the reinforcing fibers comprise carbon fibers.

In another refinement, at least a portion of the conductive strands have a cross-sectional shape that is polygonal. In yet another refinement, at least a portion of the conductive strands have a cross-sectional shape that is non-polygonal. In another refinement, the conductive strands comprise aluminum strands, and in one particular refinement the conductive strands comprise hardened aluminum strands. In yet another refinement, the conductive strands comprise copper strands.

In one construction, the compression sheath structure does not extend substantially beyond the compressed portion of a distal end of the termination arrangement.

In another construction, the compression sheath structure comprises a plurality of individual cylindrical tubes, wherein each of the individual cylindrical tubes is disposed over an end of an individual composite rod. In one refinement of this construction, the strength member comprises a central composite rod and a plurality of outer composite rods surrounding the central rod, wherein one of the individual cylindrical tubes is disposed over an end of each of the outer composite rods. In another construction, one of the individual cylindrical tubes is disposed over an end of the central composite rod. In one refinement, the individual cylindrical tubes comprise closed cylindrical tubes. In yet another refinement, the individual cylindrical tubes comprise tubes having a slot along a length thereof, e.g., to facilitate placement of the cylindrical tubes over the composite rods. In another refinement, the individual cylindrical tubes have a wall thickness of at least about 2 mm. In yet another refinement, the individual cylindrical tubes have a wall thickness of not greater than about 12 mm.

In another construction, the compression sheath structure comprises a unitary body having a plurality of apertures longitudinally-extending through the body and defining walls between adjacent apertures, wherein the apertures are configured to operatively receive the individual composite rods within the apertures. In one characterization, the unitary body has a length of at least about 400 mm. In another characterization, the unitary body has a length of not greater than about 1 meter. In yet another characterization, the walls between adjacent apertures have a minimum wall thickness of at least about 2 mm, and in a further characterization the walls between adjacent apertures have a minimum wall thickness of not greater than about 12 mm. In another refinement, the unitary body has a substantially circular cross-section.

In another construction, the compression sheath structure is structurally independent from the composite strength member. In one refinement, compression sheath structure is fabricated from a material selected from the group consisting of a metallic material, a polymeric material, and a composite material. In one particular refinement, the compression sheath structure is fabricated from a metallic material. The metallic material may be aluminum, particularly annealed aluminum, for example.

In one construction, the connector comprises an eye bolt. In another construction, the termination arrangement further comprises a jumper plate.

The present disclosure also relates to a method for terminating an overhead electrical cable, e.g., for securing an overhead electrical cable to a dead-end structure. The overhead electrical cable comprises a composite strength member that includes a plurality of individual composite rods that are operatively combined to form the composite strength member, and includes conductive strands surrounding the composite strength member. The method includes the steps of placing a compression sheath structure over the individual composite rods at a proximal end of the overhead electrical cable, placing an outer metallic sleeve over at least the proximal end of the overhead electrical cable and the compression sheath structure, and compressing at least a portion of the outer metallic sleeve onto the conductive strands.

The foregoing method may be characterized as having further refinements and/or additional steps, which may be implemented alone or in any combination. In one characterization, the compressing step comprises applying a pressure of at least about 15 tons to the outer metallic sleeve. In another characterization, the method includes the step of securing a proximal end of the composite strength member to a connector. In yet another characterization, the method includes the step of anchoring the connector to a dead-end structure.

In another embodiment, a kit comprising components that are configured to be assembled into a termination arrangement for securing an overhead electrical cable to a dead-end structure is disclosed. The components are configured to be assembled into a termination arrangement for securing an overhead electrical cable to a dead-end structure, the overhead electrical cable having a composite strength member comprising a plurality of individual composite rods that are operatively combined to form the composite strength member and having conductive strands surrounding the composite strength member. The kit includes a connector configured to anchor the termination arrangement to a dead-end structure, an outer metallic sleeve configured to surround the proximal end of the overhead electrical cable, and a compression sheath structure that is configured to be disposed over the individual composite rods along at least the length of the outer metallic housing.

DESCRIPTION OF THE EMBODIMENTS

Figure 1:
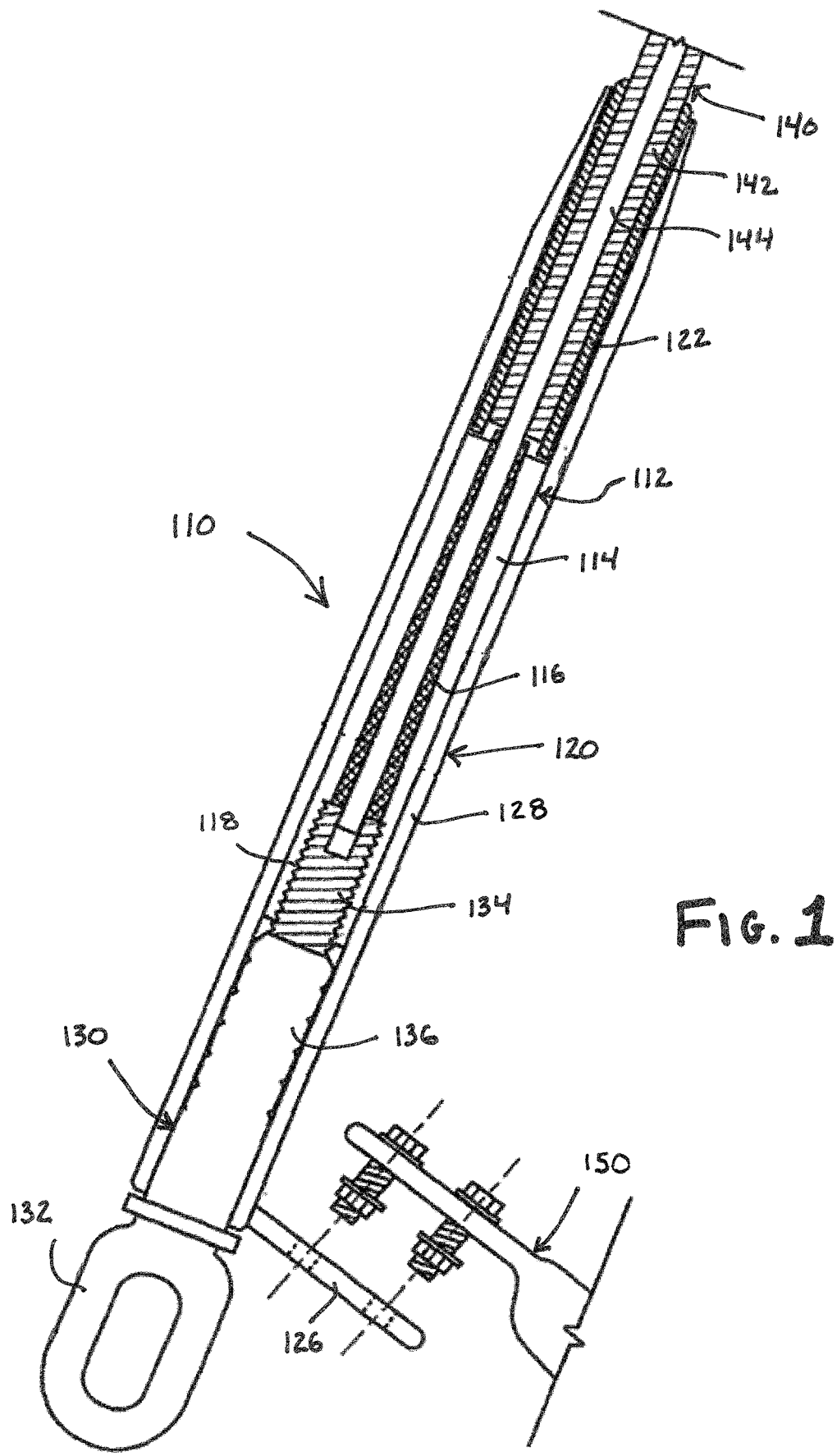
FIG. 1 illustrates a schematic view of a termination arrangement for an overhead electrical cable having a composite strength member.

FIG. 1 illustrates a termination arrangement (e.g., a dead-end) for use with an overhead electrical cable. The termination arrangement 110 illustrated in FIG. 1 is also illustrated and described in PCT Publication No. WO 2005/041358 by Bryant and in U.S. Pat. No. 8,022,301 by Bryant et al., each of which is incorporated herein by reference in its entirety.

Broadly characterized, the termination arrangement 110 illustrated in FIG. 1 includes a gripping element 112, an outer sleeve 120 and a connector 130 for anchoring the termination arrangement 110 to a dead-end structure (e.g., to a termination tower), not illustrated, e.g., using eyebolt 132. Opposite the eyebolt 132, the termination arrangement 110 is operatively connected to an overhead electrical cable 140 that includes an electrical conductor 142 that surrounds a composite strength member 144.

The gripping element 112 tightly grips the composite strength member 144 to secure the overhead electrical cable 140 to the termination arrangement 110. As illustrated in FIG. 1, the gripping element 112 includes a collet 116 having a lumen that surrounds and grips onto the strength member 144. The collet 116 is disposed in a collet housing 114. As the electrical cable 140 is tensioned and pulls the strength member 144, friction develops between the strength member 144 and the collet 116 (e.g., along the lumen), and the strength member 144 pulls the collet 116 further into the collet housing 114. The conical shape of the collet 116 and the funnel shape of the collet housing 114 create increased compression on the strength member 144, ensuring that the strength member 144 does not slip out of the collet 116.

An outer sleeve 120 surrounds the gripping element 112, and surrounds the threaded portion 134 and on intermediate portion 136 of the connector 130. The outer sleeve 120 includes a conductive body 128 to facilitate electrical conduction between the electrical conductor 142 and a jumper plate 126. For example, the conductive body 128 may be fabricated from aluminum. As illustrated in FIG. 1, the jumper plate 126 is welded onto the conductive body 128. In use, the jumper plate 126 is configured to attach to a connection plate 150 to facilitate electrical conduction between the electrical cable 140 and another conductor, e.g., another electrical cable (not illustrated) that is operatively connected to the connection plate 150.

The connector 130 includes an eyebolt 132 at a proximal end of the connector 130 and a threaded portion 134 disposed at a distal end of the connector 130. The threaded portion 134 is configured to operatively mate with a threaded portion 118 of the collet housing 114 to facilitate movement of the connector 130 toward the collet 116, pushing the collet 116 into the collet housing 114, when the connector is rotated, e.g., rotated clockwise. This strengthens the grip of the collet 116 onto the strength member 144, further securing the overhead electrical cable 140 to the termination arrangement 110. The eyebolt 132 is configured to be attached to a dead-end structure to secure the termination arrangement 110 and hence the electrical cable 140, to the dead-end structure, e.g., to a termination tower.

In some situations, it is desirable or necessary to further secure the overhead electrical cable 140 to the termination structure 110. For example, it may be desirable to crimp the outer sleeve 120 onto the connector 130, particularly onto the intermediate portion 136 of the connector. Crimping involves the application of extreme pressure to the sleeve 120 using a press and die to mechanically deform and compress the sleeve 120 onto the connector 130. Further, the sleeve 120 may also be crimped onto the overhead electrical cable 140 at the distal end of the termination structure 110. Such crimping of the outer sleeve 120 ensures that the housing 120 will not move relative to the overhead electrical cable 140 after installation. The termination structure 110 may also include a metallic (e.g., aluminum) inner filler sleeve 122 to enhance the electrical and mechanical contact between the outer sleeve 120 and the electrical cable 140 when the sleeve 120 is crimped onto the electrical cable 140. The use of a soft (e.g., annealed) aluminum for the electrical conductor 142 (e.g., conductive strands), and the use of trapezoidal conductive strands, prevents damage to the composite strength member 144 when the outer sleeve 120 is crimped onto the electrical cable 140.

Figure 2:
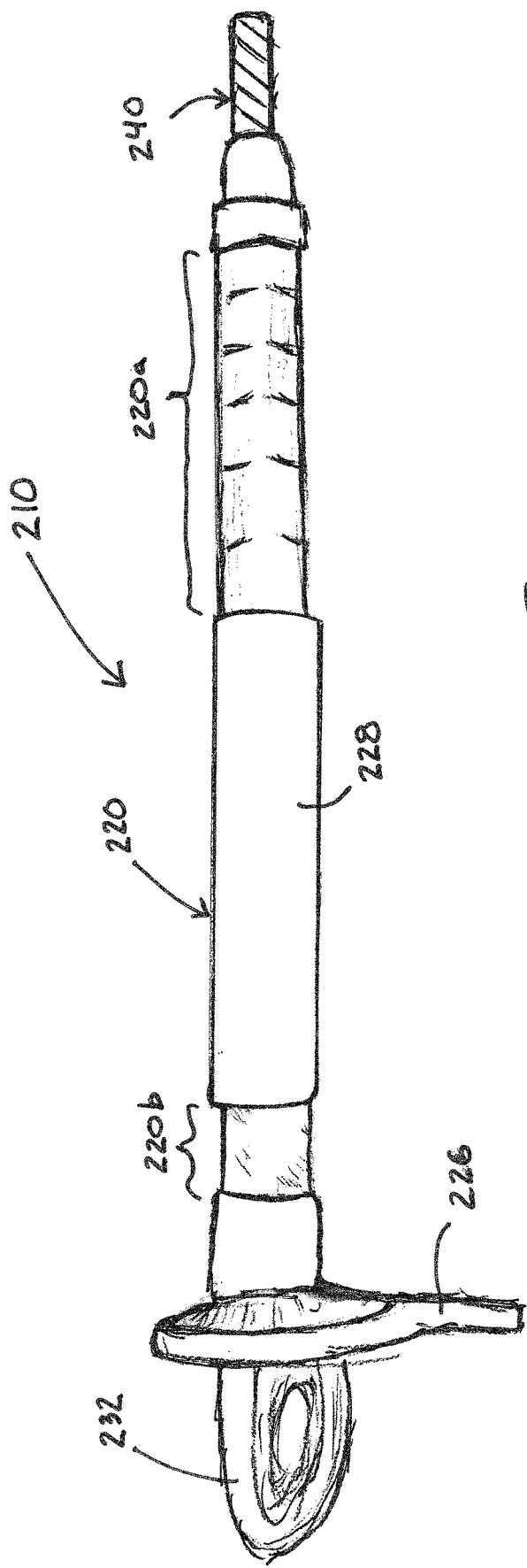
FIG. 2 illustrates a perspective view of a termination arrangement that has been crimped onto an overhead electrical cable.

FIG. 2 illustrates a perspective view of a termination arrangement that has been crimped onto an overhead electrical cable. As is described above with respect to FIG. 1, the termination arrangement 210 includes a connector having an eye bolt 232 that extends outwardly from a proximal end of an outer metallic sleeve 220. A jumper plate 226 is welded to the proximal end of the conductive body 228 for electrical connection to, e.g., a connection plate (see FIG. 1). As illustrated in FIG. 2, the outer sleeve 220 is crimped over two regions, namely proximal crimped region 220b and distal crimped region 220a. The proximal crimped region 220b is situated over an intermediate portion of the connector (see FIG. 1), and the distal crimped region 220a is situated over a portion of the overhead electrical cable 240. The extreme compressive forces placed around the outer sleeve 220 during the crimping operation are transferred to the underlying components, i.e., to the connector under the crimped region 220b and to the overhead electrical cable 240 under the crimped region 220a.

Thus, the conductive strands and other components of the termination arrangement, e.g., the outer sleeve, are fabricated from aluminum. As used herein, and unless otherwise specified, when the term "aluminum" is used on its own, it refers generally to pure aluminum or aluminum alloys (e.g., comprising at least about 50 wt. % aluminum), as well as all types of aluminum that have been heat treated (e.g., annealed), work hardened, extruded or otherwise processed in a manner that results in a desirable property in the final component. As used herein, the term "soft aluminum" refers to a substantially pure (e.g., unalloyed) form of aluminum, which may be annealed. Examples of soft aluminum include the Aluminum Association "1xxx" series (e.g., greater than 99% aluminum) that have been annealed, such as the AA1350-O aluminum, which is a fully annealed aluminum. Further, the terms "hardened aluminum" or "hard aluminum" refer to aluminum that that has a tensile strength of at least about 100 MPa, such as at least about 120 MPa, such as at least about 150 MPa, or even at least about 200 MPa. Hardened aluminum may have a tensile strength up to about 380 MPa, for example. As noted above, when the conductive strands surrounding the composite strength member are fabricated from a soft aluminum, the strand will deform and absorb some of the compressive force, thereby reducing the stresses on the underlying composite strength member. The use of trapezoidal-shaped (i.e., trapezoidal cross-section) conductive stands, which have a high surface area in direct contact with the strength member, can also reduce the stress that is placed on the composite strength member. As a result, there is very low probability that the crimping operation will damage the underlying composite strength member.

Figure 3:
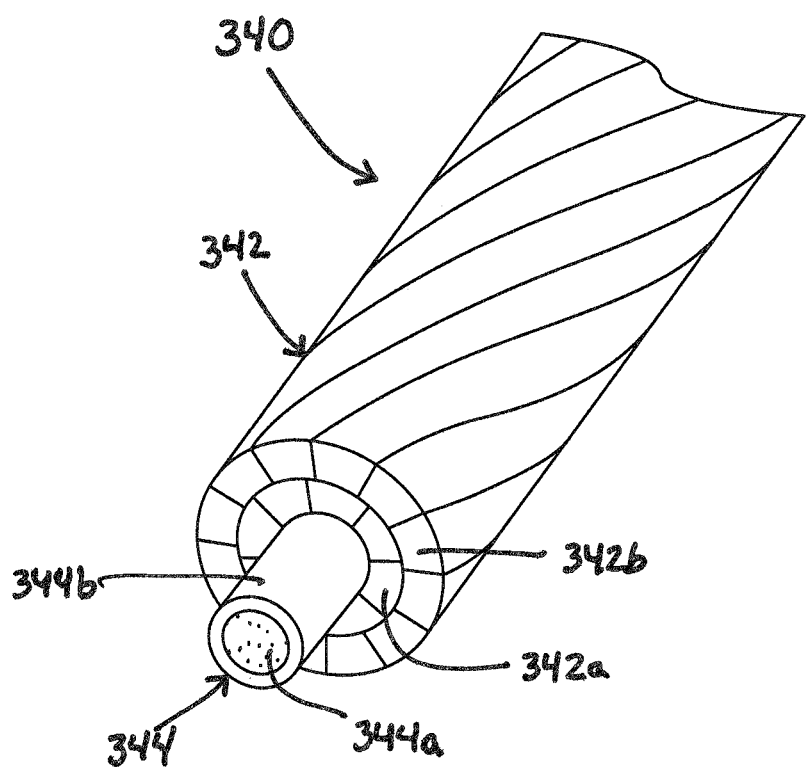
FIG. 3 illustrates a perspective view of an overhead electrical cable having a composite strength member.

FIG. 3 illustrates a cross-section of an overhead electrical cable 340. The cable 340 includes an electrical conductor 342 for the conduction of electricity. The electrical conductor includes of two layers of conductive strands 342a and 342b that are wrapped (e.g., stranded) around a central strength member 344. The strength member 344 is formed from a single rod of a fiber-reinforced composite material having an inner carbon fiber core 344a and an outer layer 344b of an insulative material such as glass fibers.

The conductive strands 342a/342b have a substantially trapezoidal cross-section with top and bottom surfaces that may be slightly curved (e.g., arcuate) to form the substantially cylindrical conductor structure with few gaps between adjacent strands 342a/342b and between the strands 342a and the strength member 344. The conductive strands 342a/342b are selected to have a high conductivity and are fabricated from AA-1350-O aluminum having a high conductivity (e.g., about 61% IACS).

In some installations, however, the overhead electrical cable includes a conductor formed from conductive strands that have a shape (e.g., the cross-section) that creates stress points along a length of the composite strength member when the outer sleeve is compressed onto the conductive strands. For example, conductive stands having a circular cross-section may produce stress points due to the relatively small contact area of the strands with the underlying composite strength member. Under such circumstances, the strength member may be susceptible to damage (e.g., fracture) when the conductive strands are compressed onto the strength member at high pressure.

The conductive strands may also be formed from hard aluminum, such as when the line is installed in a region the experiences heavy ice-loading of the electrical cable. For example, the conductive strands may include, but are not limited to, conductive strands of Al—Zr alloys or AA1350-H10 aluminum, which is a strain-hardened aluminum.

Figure 4B:
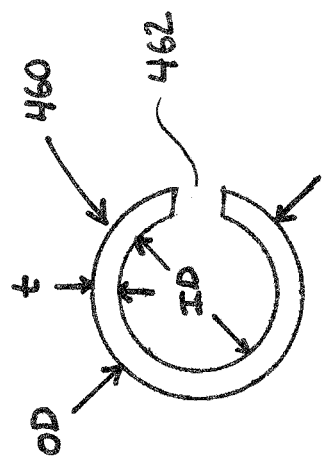
FIGS. 4A-4B illustrate a compression sheath according to an embodiment of the present disclosure.
Figure 4A:
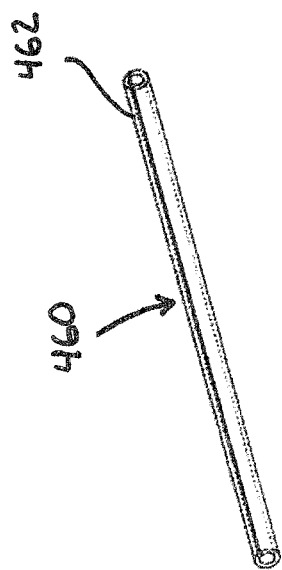

According to the present disclosure, a compression sheath is included between the conductive strands and the composite strength member, at least along the portion of the overhead electrical cable that is subject to compression. The compression sheath is configured to absorb (e.g., to dissipate) at least a portion of the compressive stresses that would otherwise be placed on the composite strength member. FIG. 4A illustrates a perspective view of a compression sheath according to an embodiment of the present disclosure, and FIG. 4B illustrates a cross-section of the compression sheath of FIG. 4A. The compression sheath 460 is configured (e.g., shaped and sized) to slide over a composite strength member, for example a single-element composite strength member having a circular cross-section, and under the conductive strands.

In this regard, the inner diameter (ID) of the compression sheath 460 is sized to substantially match the outer diameter of the strength member, e.g., so that there is substantially no gap between the inner circumference of the compression sheath 460 and the outer circumference of the composite strength member. For example, the inner diameter of the compression sheath for use with a single-element composite strength member may be at least about 1 mm, such as at least about 2 mm, such as at least about 2.5 mm. Typically, the inner diameter of the compression sheath for use with a single-element composite strength member will typically not be greater than about 25 mm, such as not greater than about 20 mm, or even not greater than about 15 mm.

The thickness (t) of the compression sheath should be sufficient to protect the underlying composite strength member from fracturing under the compressive forces of the crimping operation. However, if the thickness is too large, it may be difficult to place (e.g., to slide) the sheath between the composite strength member and the conductive strands during the termination process. In one characterization, the sheath has a thickness of at least about 0.20 mm, such as at least about 0.5 mm, such as at least about 1.0 mm. In another characterization, the sheath has a thickness of not greater than about 2.6 mm, such as not greater than about 2.0 mm.

The compression sheath 460 may be fabricated from a variety of materials. In one characterization, the compression sheath 460 is fabricated from a metallic material. In one particular characterization, the compression sheath may be fabricated from aluminum. The use of hardened aluminum is particularly advantageous for the compression sheath because it allows the aluminum sheath to maintain its shape while being installed in between the composite core strand and the conductive strands wrapped around the composite core. Hardened aluminum is also readily extrudable.

In one particular characterization, the compression sheath is fabricated from an Aluminum Association Series 6xxx alloy ("AA6xxx alloy"), which typically has a tensile strength of at least about 150 MPa and not greater than about 380 MPa. AA6xxx alloys include silicon and magnesium as alloying elements to form magnesium silicide with the alloy. Other useful aluminum alloys include Al—Zr alloys such as AA7xxx alloys. Other useful metals for the compression sleeve may include copper and steel. Non-metallic materials may also be useful, such as high performance plastics (e.g., polymers) including, but not limited to, PEEK (polyetheretherketone), PEK (polyehterketone) and PES (poly(ethersulfone)). Such plastics may be reinforced with fibers such as carbon fibers, glass fibers, aramid fibers, fluorocarbon fibers (e.g., PTFE fibers) and the like to enhance the mechanical properties of the plastic.

As illustrated in FIGS. 4A-4B, the compression sleeve 460 may include a longitudinally-extending slot 462. The longitudinally extending slot 462 may facilitate the placement of the compression sleeve 460 over the composite strength member during assembly of the termination arrangement. Although illustrated as a longitudinally-extending slot 462, the compression sleeve 460 may also include a non-linear slot, such as a slot that is in the shape of a spiral around the outer circumference of the sleeve 460. Other sheath configurations may include knurls around the outside of the surface of the sheath, and/or a taper on one or both ends. These configurations may facilitate the separation of the conductive strands from the composite strength member and allow the sheath to more easily be inserted between the composite strength member and the conductive strands wrapped around the composite strength member. Further, the sheath may be configured in two or more parts that can come together to form a substantially continuous cylinder around the composite strength member when installed between the strength member and the conductive strands wrapped around the strength member.

In another configuration, the compression sheath may include a closed cylindrical tube, e.g., a cylindrical tube that is open at both ends and does not include a slot or other separation along the wall of the sheath.

The length of the compression sheath 460 is selected such that the compression sheath 460 surrounds the composite strength member at least along the length of composite strength member that is subjected to the compressive forces during the crimping process. In one characterization, the compression sheath 460 has a length of at least about 150 mm, such as at least about 450 mm. However, the compression sheath 460 should not extend substantially beyond the length of composite strength member that is under compression, e.g., should not extend toward the connector beyond the conductive strands. In one characterization, the compression sheath 460 has a length of not greater than about 915 mm, such as not greater than about 650 mm.

Figure 5:
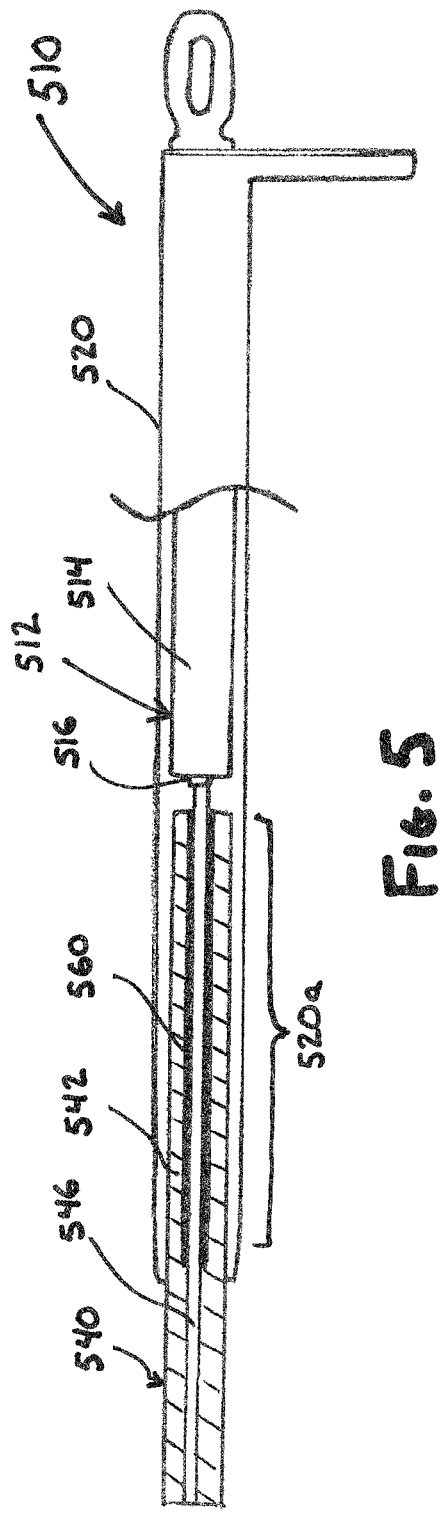
FIG. 5 illustrates a termination arrangement according to an embodiment of the present disclosure.

FIG. 5 illustrates a partial cross-section of a termination arrangement according to the present disclosure, e.g., for securing an overhead electrical cable to a dead-end structure. The overhead electrical cable 540 includes a composite strength member 546 and conductive strands 542 surrounding the composite strength member 546. The termination arrangement 510 includes a gripping element secured by the connector and gripping the composite strength member 546 at a proximal end of the overhead electrical cable 540. As illustrated in FIG. 5, the gripping element 512 includes a collet 516 and a collet housing 514, where the collet 516 extends slightly beyond the housing 514 and grips the composite strength member 546. The outer metallic sleeve 520 surrounds the gripping element 512 and the proximal end of the overhead electrical cable 540. A compressed portion 520a of the outer metallic sleeve 520 is disposed over (e.g., around) the proximal end of the overhead electrical cable 540. The compression sheath 560 is disposed between the composite strength member 546 and the conductive strands 542 along at least the length of the compressed portion 520a.

The termination arrangement 510 is particularly suited for use with an overhead electrical cable 540 that includes a composite strength member 546. Examples of overhead electrical cables for which the termination arrangement 510 is particularly useful include, but are not limited to, those having a strength member comprising reinforcing fibers bound in a matrix, such as a polymeric matrix or a metallic matrix. The reinforcing fibers may be substantially continuous reinforcing fibers that extend along the length of the composite strength member, and/or may include short reinforcing fibers (e.g., fiber whiskers or chopped fibers) that are dispersed through the matrix. The fibers may be selected from a wide range of materials, including but not limited to, carbon, glass, boron, metal oxides, metal carbides, high-strength polymers such as aramid fibers or fluoropolymer fibers, basalt fibers and the like. The matrix material may include, for example, a plastic (e.g., polymer) such as a thermoplastic polymer or a thermoset polymer. The matrix may also be a metallic matrix, such as an aluminum matrix. One example of an aluminum matrix composite strength member is illustrated in U.S. Pat. No. 6,245,425 by McCullough et al., which is incorporated herein by reference in its entirety. One example of a polymer matrix fiber-reinforced strength member is the strength member used in the ACCC® overhead electrical cable that is manufactured by CTC Global Corporation of Irvine, CA, USA. Such an overhead electrical cable is illustrated, for example, in U.S. Pat. No. 7,368,162 by Hiel et al, which is incorporated herein by reference in its entirety. Although illustrated in FIG. 5 as a single-element strength member 546 (e.g., a single rod), the strength member may include a plurality of individual composite elements that are combined (e.g., helically twisted together) to form the strength member, as is discussed in more detail below.

The conductive strands 542 may have a polygonal or a non-polygonal cross-section. In one characterization, the conductive strands 542 have a non-polygonal cross-section, e.g., that creates stress points along the length of the composite strength member 546 that is being compressed. In one characterization, the conductive strands include strands having a circular cross-section section that are in direct contact with the composite strength member 546. Strands having a circular cross-section concentrate the applied force along the line of contact between the circular strand and the composite strength member, which may lead to fracture of the composite strength member 546 even under relatively moderate compressive loads. The conductive strands may be fabricated from conductive metallic materials, including but not limited to, aluminum and copper. One particular characterization, the conductive strands include hardened aluminum, e.g., non-annealed, aluminum conductive strands such as Al—Zr conductive strands or AA1350-H19 conductive strands.

Figure 6A:
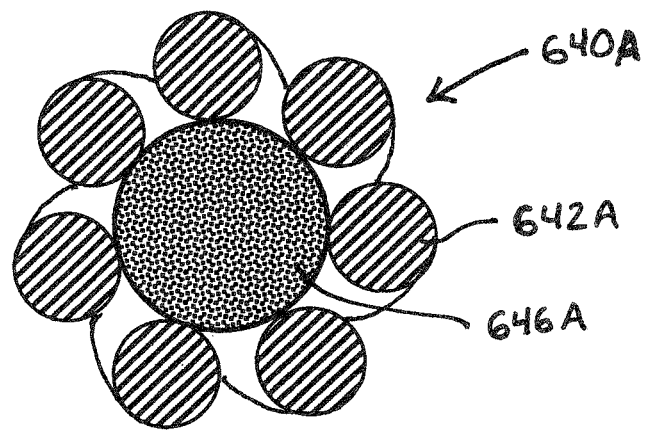
FIGS. 6A-6B illustrate cross-sectional views of overhead electrical cables.
Figure 6B:
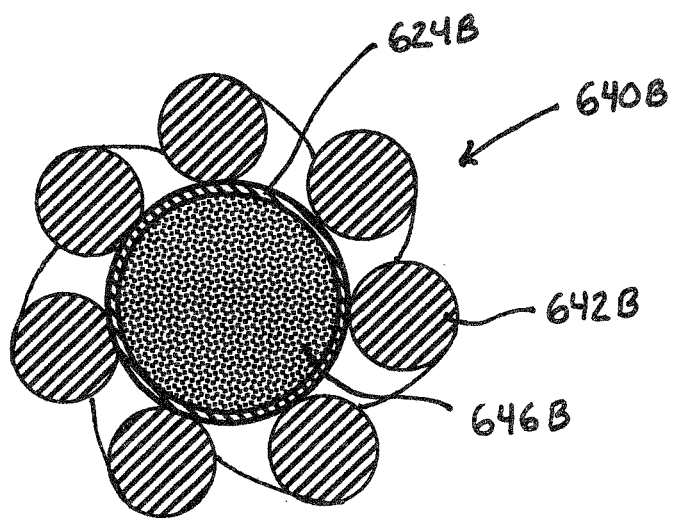

FIGS. 6A and 6B illustrate schematic cross-sections of an end of an overhead electrical cable without a compression sheath (FIG. 6A) and with a compression sheath (FIG. 6B). As illustrated in FIG. 6A, the overhead cable 640A comprises a composite strength member 646A that includes carbon fibers in a polymeric matrix. A plurality of conductive strands 642A having a circular cross-section are helically wrapped around the strength member 646A. It can be seen in FIG. 6A that the circular conductive strands 642A have a relatively small portion that is in direct contact with the underlying strength member 646A. Thus, when the conductive strands 642A are compressed onto the strength member 646A during a crimping operation, stresses are concentrated under the portion of conductive strand 642A contacting the strength member 646A.

FIG. 6B illustrates the use of a compression sheath during the termination process according to an embodiment of the present disclosure. Similar to FIG. 6A, the overhead cable 640B comprises a composite strength member 646B that includes carbon fibers in a polymeric matrix. A plurality of conductive strands 642B having a circular cross-section are helically wrapped around the strength member 646B. In the embodiment of FIG. 6B, a compression sheath 624B is placed between the conductive strands 642B and the composite strength member 646B. The compression sheath 624B is a closed cylindrical tube that is placed over (e.g., slid onto) the composite strength member 646B before the crimping operation. As a result, when the conductive strands 642B are compressed onto the strength member 646B during the crimping operation, the compression sheath 624B absorbs and distributes the compressive forces around the entire circumference of the strength member 646B, thereby reducing the chance of a fracture in the strength member 646B.

Figure 7:
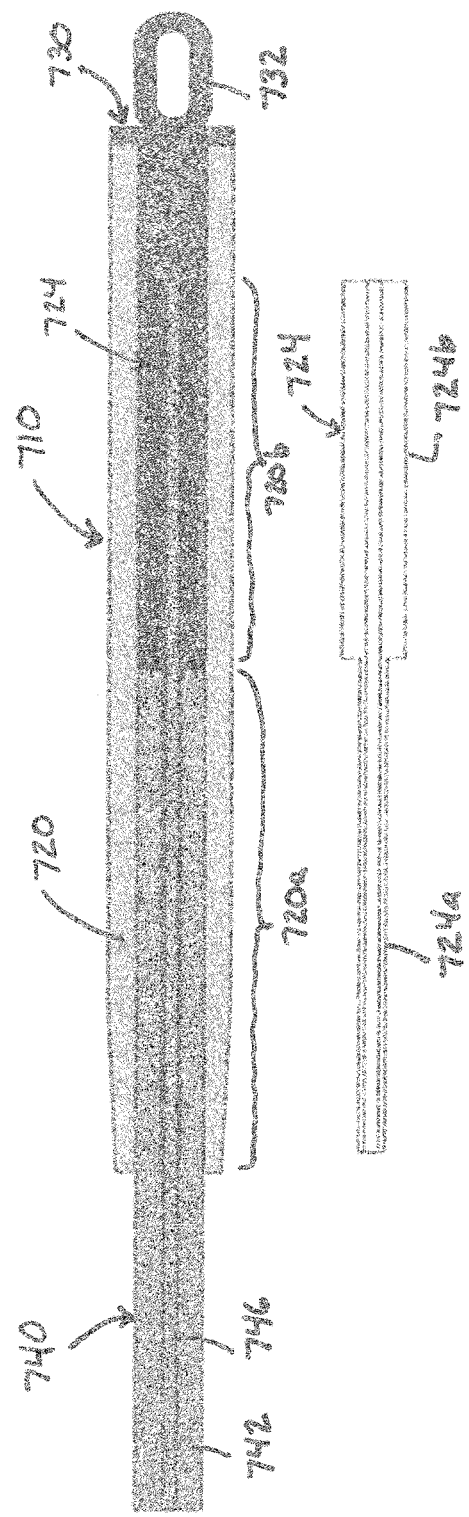
FIG. 7 illustrates a cross-sectional view of a termination arrangement and a compression sleeve according to an embodiment of the present disclosure.

FIG. 7 illustrates another embodiment of a termination arrangement according to the present disclosure. The embodiment of a termination arrangement illustrated in FIG. 7 is a modification of the termination arrangement disclosed in U.S. Pat. No. 7,348,489 by Chadbourne, which is incorporated herein by reference in its entirety.

As illustrated in FIG. 7, the termination arrangement 710 includes a connector 730 having an eye bolt 732, e.g., for anchoring the termination arrangement 710 to a dead-end structure. A distal portion 724a of the compression sheath 724 is disposed between the composite strength member 746 and the conductive stands 742 along a distal portion 720a of the outer metallic housing. The compression sheath 724 includes a proximal portion 724b that has an outer diameter that is larger than the outer diameter of the distal portion 724a. The proximal portion 724b is disposed between the interior of the connector 730 and a portion of the composite strength member 746 that extends beyond the conductive strands 742. In this manner, the outer metallic housing 720 may be crimped along substantially its entire length, e.g., along portions 720a and 720b, while the composite strength member 746 remains protected along the entire length that is subject to the compressive stresses.

It will be appreciated from the foregoing that the present disclosure is also directed to a method for securing an overhead electrical cable to a dead-end structure. Broadly characterized, the overhead electrical cable includes a composite strength member and conductive strands surrounding the composite strength member. The method includes placing a compression sheath between the composite strength member and the conductive strands at a proximal end of the overhead electrical cable, placing an outer metallic sleeve over at least the proximal end of the overhead electrical cable and the compression sheath, and compressing at least a portion of the outer metallic sleeve onto the conductive strands.

The method may be implemented using the termination arrangement disclosed above. The step of compressing the outer sleeve onto the conductive strands may utilize a pressure of at least about 15 tons to deform and compress the outer sleeve.

It will also be appreciated from the foregoing that the present disclosure is also directed to a kit, e.g., an assembly of components that are configured to be assembled into a termination arrangement for securing an overhead electrical cable to a dead-end structure is disclosed. The kit may include a connector configured to anchor the termination arrangement to a dead-end structure, a gripping element configured to be secured by the connector and to operatively grip the composite strength member at a proximal end of the overhead electrical cable, an outer metallic sleeve configured to surround at least the gripping element and the proximal end of the overhead electrical cable, and a compression sheath configured to be disposed between the composite strength member and the conductive strands along at least the length of the outer metallic housing.

Figure 8:
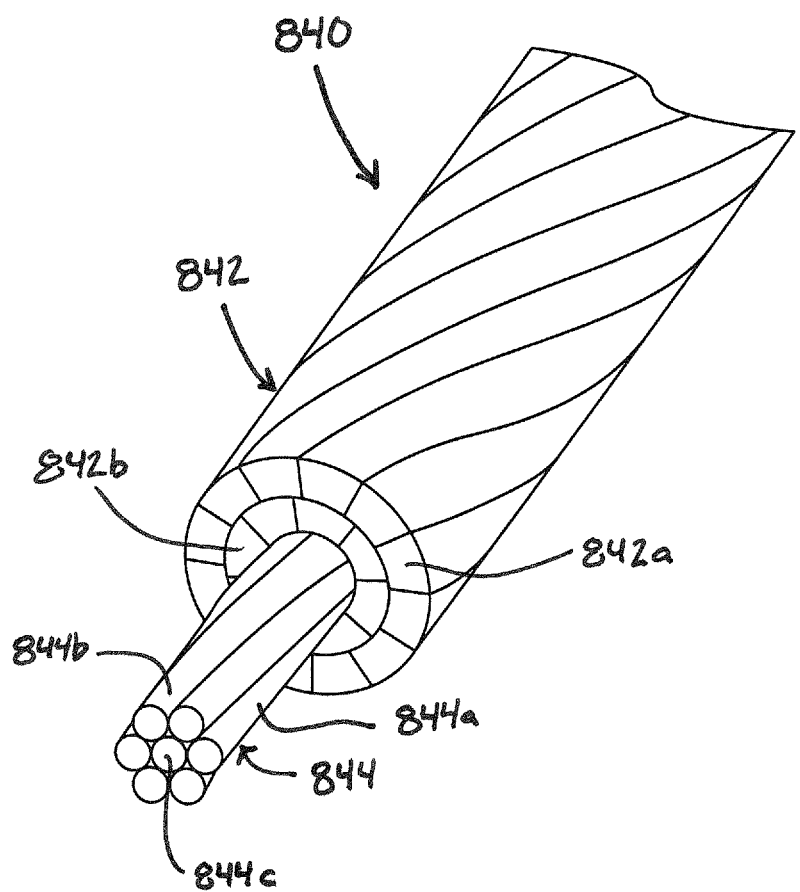
FIG. 8 illustrates a perspective view of an overhead electrical cable having a multi-element composite strength member.

FIG. 8 schematically illustrates a configuration for an overhead electrical cable 840. As illustrated in FIG. 8, the strength member 844 includes seven individual composite rods, e.g., rods 844a and 844b, that are operatively combined (e.g., helically wrapped) to form the strength member 840. The composite rods may be fabricated from, for example, a fiber-reinforced composite material. An electrical conductor 842 comprises conductor strands, e.g., strands 842a and 842b that may be fabricated from an electrically conductive material, such as copper, aluminum, copper alloys or aluminum alloys. Although illustrated as including seven composite rods, it will be appreciated that the strength member 844 may include any number of composite rods, e.g., few than seven or more than seven composite rods. In certain embodiments, the strength member includes a single central rod, e.g., rod 844c, with an even number (e.g., 4, 6, 8 or 10) of outer rods surrounding (e.g., helically wrapped around) the central rod.

Such a multi-element configuration will typically have an effective outer diameter that is larger than the diameter of a single-element composite strength member. Examples of such multi-element composite strength members include, but are not limited to: the multi-element aluminum matrix composite strength member illustrated in U.S. Pat. No. 6,245,425 by McCullough et al.; the multi-element carbon fiber strength member illustrated in U.S. Pat. No. 6,015,953 by Tosaka et al.; and the multi-element carbon fiber strength member illustrated in U.S. Pat. No. 9,685,257 by Daniel et al. Each of these U.S. patents is incorporated herein by reference in its entirety.

In one embodiment, a compression sleeve structure is utilized, where the compression sleeve structure surrounds a plurality of the individual composite rods to create a ductile barrier between the composite strength member (e.g., the individual composite rods) and the conductive strands, and to create a ductile barrier between adjacent composite rods. In this manner, direct contact between adjacent composite rods can be reduced or eliminated, as well as contact between the composite rods and the electrical conductor.

Figure 9A:
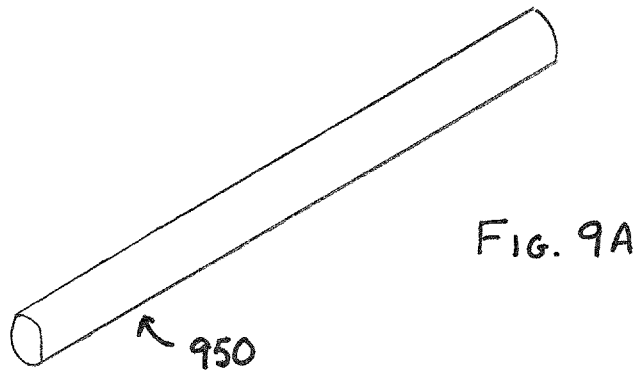
FIGS. 9A-9C illustrate a compression sheath structure according to an embodiment of the present disclosure.
Figure 9B:
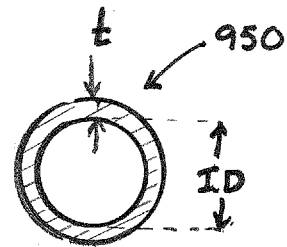
Figure 9C:
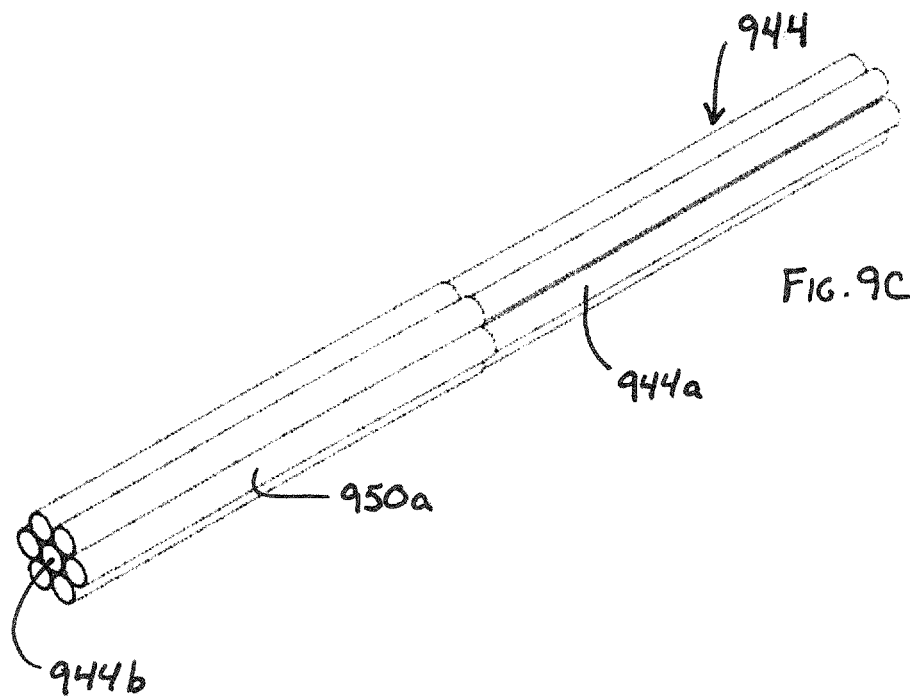

One arrangement of such a compression sleeve structure is illustrated in FIGS. 9A-9C. The arrangement illustrated in FIGS. 9A-9C includes the use of FIG. 9A illustrates a perspective view of an individual cylindrical tube 950 that may be utilized. The cylindrical sleeve 950 may be fabricated from a variety of materials including, but not limited to, metallic materials and polymeric materials. Useful metallic materials include aluminum, particularly annealed (soft) aluminum which has the ability to deform and flow around the composite rods when the strength member is compressed. Useful polymeric materials include thermoplastic polymers and thermoset polymers.

Thus, the compression sleeve structure is comprised of several individual elements, e.g., is comprised of a plurality of individual tubes, e.g., cylindrical tubes 950. The cylindrical tubes are sized such that the tubes can be placed over the ends of the individual composite rods. For example, the individual tubes may have an inner diameter ("ID") that closely approximates the outer diameter of the composite rods so that the tubes may be friction fit over the ends of the strength member 944 as illustrated by cylindrical sleeve 950a fit over composite rod 944a in FIG. 9C. To ensure an adequate amount of material between adjacent composite rods, the cylindrical sleeves 950 may have a wall thickness ("t") of at least about 2 mm, such as at least about 4 mm. It is generally preferred that the wall thickness be not greater than about 15 mm, such as not greater than about 12 mm, such as not greater than about 10 mm. The cylindrical sleeves 950 should have a length that is sufficient to ensure protection of the composite rods along the entire length that is subjected to compressive forces during crimping. For example, the cylindrical sleeves may have a length of at least about 300 mm, such as at least about 400 mm, or even at least about 500 mm. Typically, the length of the sleeve will not exceed about 1 meter. Although illustrated in FIG. 9A as comprising a closed cylinder, the composite rod may include a longitudinal slot (e.g., a cut) in the cylinder wall, e.g., to facilitate placement of the cylindrical tube over the composite rod. See FIG. 4A, for example.

As illustrated in FIG. 9C, a cylindrical tube is placed over an end of each of the composite rods, e.g., each of the outer cylindrical rods (e.g., rod 944a), as well as over central rod 944b. However, it may not be necessary to place a cylindrical tube over and end of each rod. For example, a cylindrical tube may be placed over an end of each of the outer composite rods while the central composite rod 944b remains bare.

Figure 10A:
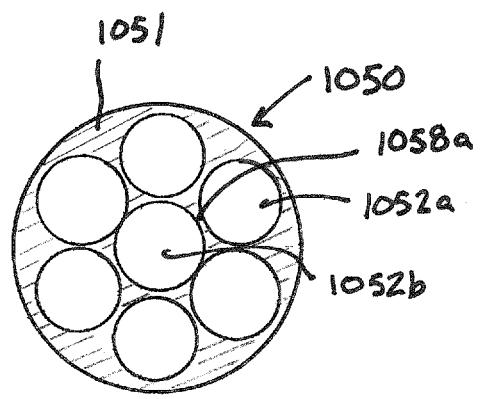
FIGS. 10A-10B illustrate a compression sheath structure according to an embodiment of the present disclosure.
Figure 10B:
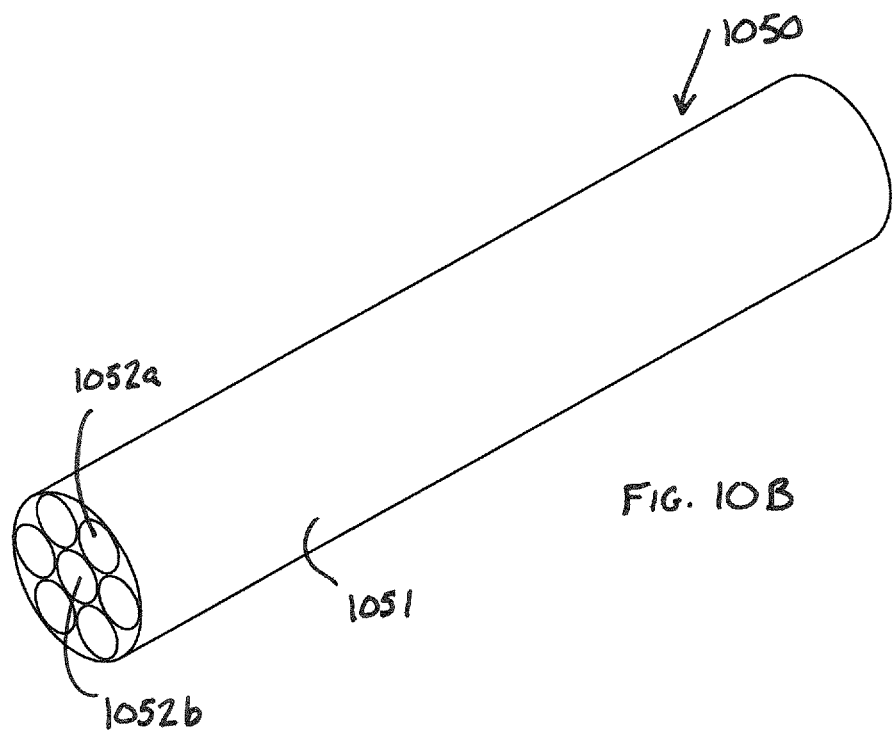

Another arrangement of such a compression sheath structure is illustrated in FIGS. 10A and 10B. The compression sheath structure 1050 includes a unitary body 1051 having a circular cross-section and a plurality of apertures longitudinally-extending through the body 1051, such as a central aperture 1052b and a plurality of outer apertures, e.g., aperture 1052a. The apertures define walls between adjacent apertures, e.g., wall 1058a between apertures 1052a and 1052b. Each of the apertures is configured (e.g., shaped and sized) to operatively receive a composite rod when the compression sheath structure 1050 is placed onto the strength member. The sheath structure 950 should have a length that is sufficient to ensure protection of the composite rods along the entire length that is subjected to compressive forces during crimping. For example, the sheath structure 950 may have a length of at least about 300 mm, such as at least about 400 mm, or even at least about 500 mm. Typically, the length of the sheath structure will not exceed about 1 meter.

Preferably, the minimum thickness of the walls (e.g., at the point that two adjacent apertures are closest) will be at least about 4 mm, such as at least about 6 mm. It is generally preferred that the wall thickness be not greater than about 25 mm, such as not greater than about 20 mm, such as not greater than about 15 mm.

Figure 11A:
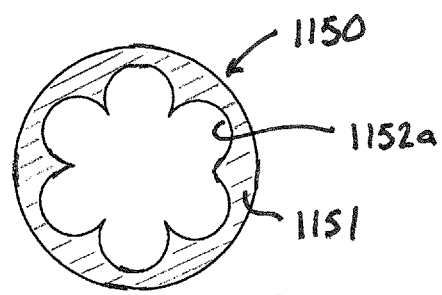
FIGS. 11A-11B illustrate a compression sheath structure according to an embodiment of the present disclosure.
Figure 11B:
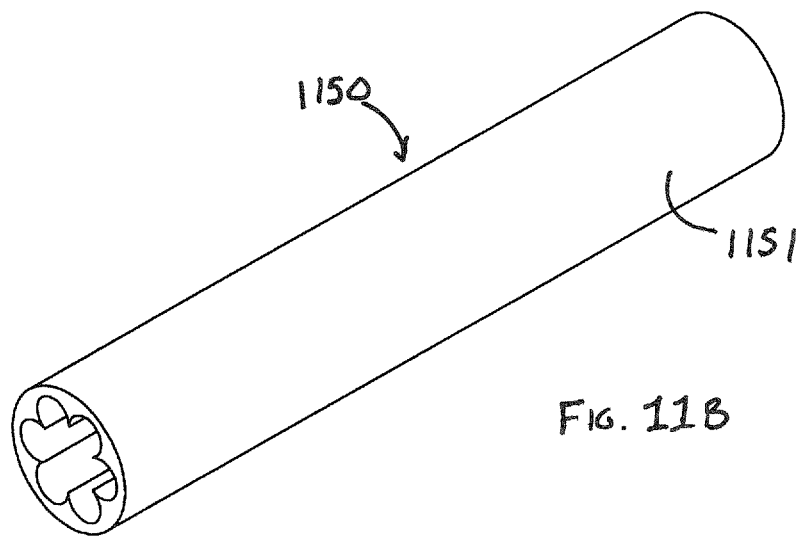

FIGS. 11A and 11B illustrate another arrangement of such a compression sheath structure. The compression sheath structure 1150 includes a unitary body having fluted interior circumference that forms a plurality of longitudinally-extending grooves (e.g. groove 1152a). The grooves are configured (e.g., sized and shaped) to operatively separate and restrict movement of the composite rods when the sheath structure is placed over the strength member. In this manner, the outer composite rods may be protected from the adjacent outer composite rods. Optionally, the sheath structure 1150 may be used in combination with a cylindrical tube (e.g., as illustrated in FIG. 9C) to prevent direct contact between the outer composite rods and the central composite rod.

Figure 12A:
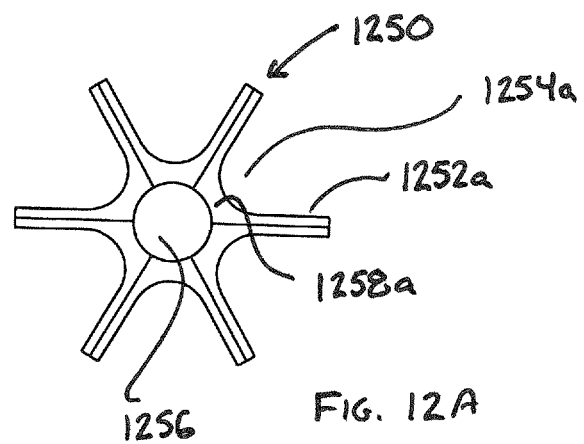
FIGS. 12A-12B illustrate a compression sheath structure according to an embodiment of the present disclosure.
Figure 12B:
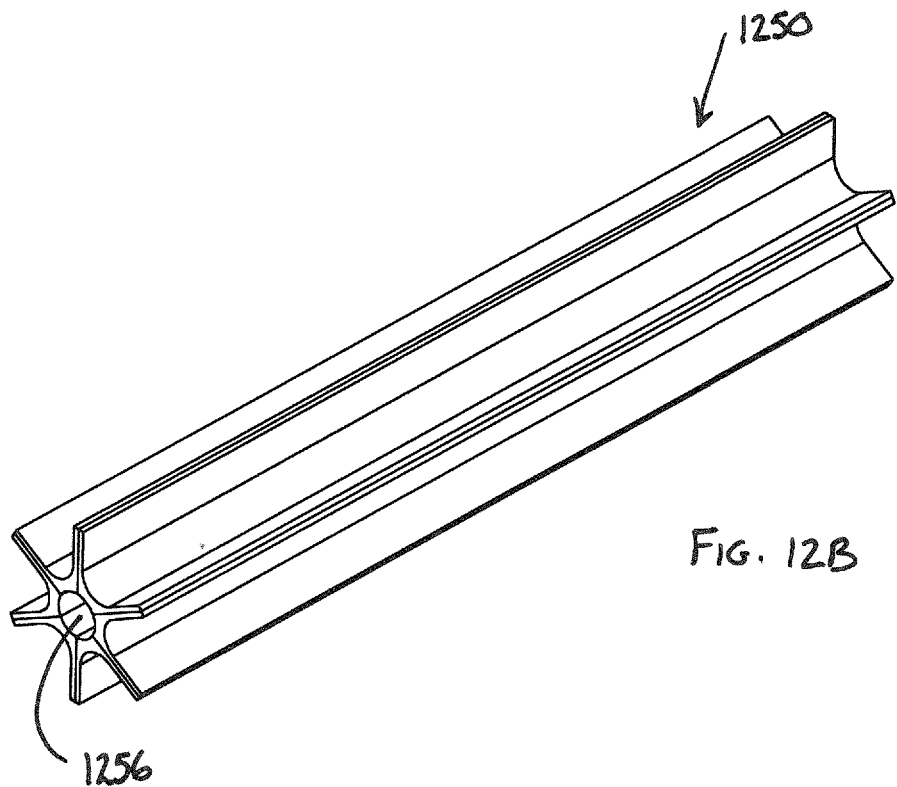

FIGS. 12A and 12B illustrate yet another arrangement of a compression sheath structure according to the present disclosure. The compression sheath structure 1250 includes a longitudinally-extending central aperture 1256 and a plurality of longitudinally-extending channels (e.g., channel 1254a) radially spaced away from the central aperture 1256 and separated from the central aperture, e.g., by wall 1258a. The channels are configured (e.g., sized and shaped) to operatively receive composite rods along a length of the sheath structure 1250 to operatively separate adjacent composite rods that are disposed in adjacent channels. As illustrated in FIGS. 12A and 12B, the compression sheath structure 1250 is formed by combining a plurality of individual channel elements, e.g., each element including a channel and a curved portion of the wall forming the central aperture 1256. In another embodiment, the compression sheath structure 1250 may be formed from a single unitary body.

Figure 13A:
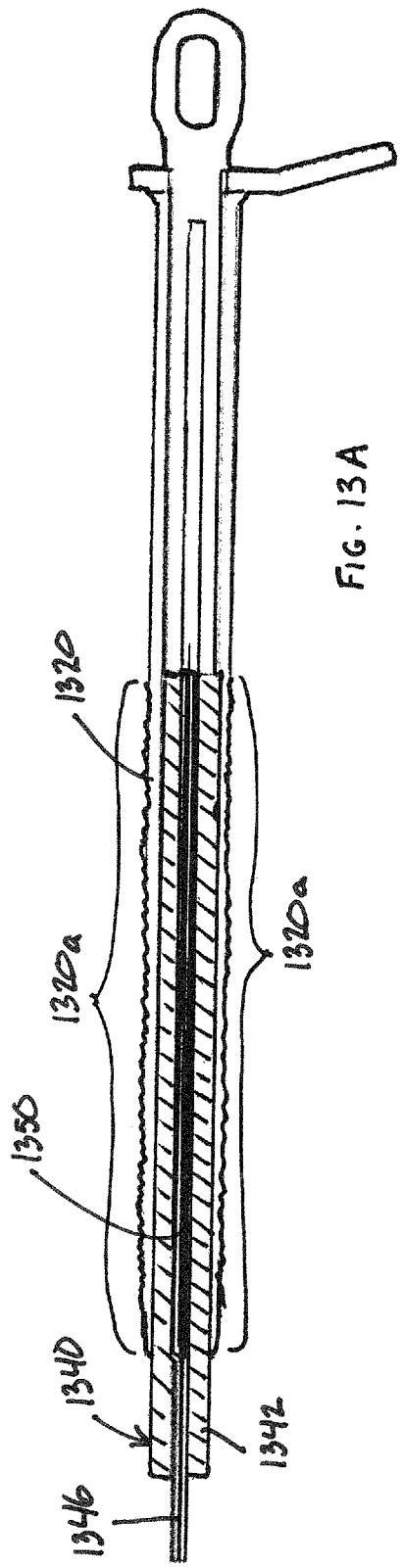
FIGS. 13A-13B illustrate a termination arrangement according to an embodiment of the present disclosure.
Figure 13B:
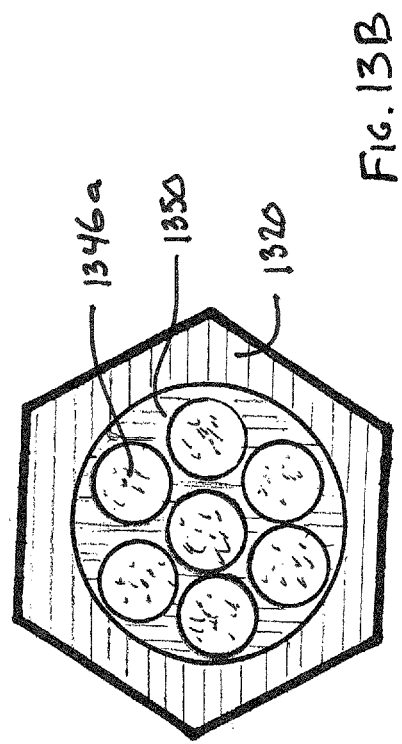

FIGS. 13A-13B illustrate a termination arrangement according to the present disclosure, e.g., for securing an overhead electrical cable to a dead-end structure. The overhead electrical cable 1340 includes a composite strength member 1346 and conductive strands 1342 surrounding the composite strength member 1346. The composite strength member 1346 includes a plurality of composite rods (e.g., composite rod 1346a) that are combined to form the strength member 1346. An outer metallic sleeve 1320 the proximal end of the overhead electrical cable 1340. A compressed portion 1320a of the outer metallic sleeve 1320 is disposed over (e.g., around) the proximal end of the overhead electrical cable 1340. The compression sheath structure 1350 is disposed between the composite strength member 1346 and the conductive strands 1342 along at least the length of the compressed portion 1320a. A partial cross-section of the compressed portion 1320a is illustrated in FIG. 13B. The compression sheath structure 1350 is now plastically deformed to the point where the material has flowed around and between the composite rods (e.g., rod 1346a) and has protected the rods from cracking during the crimping operation.

The present disclosure also relates to a method for securing an overhead electrical cable to a dead-end structure where the overhead electrical cable includes a composite strength member and conductive strands surrounding the composite strength member, the strength member comprising a plurality of individual composite rods that are operatively combined to form the composite strength member. In one embodiment, the method includes placing a compression sheath structure over the individual composite rods at a proximal end of the overhead electrical cable, placing an outer metallic sleeve over at least the proximal end of the overhead electrical cable and the compression sheath, and compressing at least a portion of the outer metallic sleeve onto the conductive strands. The compression sheath structure may comprise an arrangement as described above and as illustrated in FIGS. 9-12.

The present disclosure also relates to a kit comprising components that are configured to be assembled into a termination arrangement for securing an overhead electrical cable to a dead-end structure, the overhead electrical cable having a composite strength member comprising a plurality of individual composite rods that are operatively combined to form the composite strength member and having conductive strands surrounding the composite strength member. The kit may include, for example, a connector configured to anchor the termination arrangement to a dead-end structure, an outer metallic sleeve configured to surround the proximal end of the overhead electrical cable, and a compression sheath structure that is configured to be disposed over the individual composite rods along at least the length of the outer metallic housing. The compression sheath structure may comprise an arrangement as described above and as illustrated in FIGS. 9-12.

While various embodiments of a termination arrangement and a method for securing an overhead electrical cable to a dead-end structure have been described in detail, it is apparent that modifications and adaptations of those embodiments will occur to those skilled in the art. However, it is to be expressly understood that such modifications and adaptations are within the spirit and scope of the present disclosure.

What is claimed is:

1. A termination arrangement securing an overhead electrical cable to a dead-end structure, the overhead electrical cable having a composite strength member comprising a plurality of individual fiber-reinforced composite rods that are operatively combined to form the composite strength member and having conductive strands surrounding the composite strength member, the termination arrangement comprising:
   a connector anchoring the termination arrangement to the dead-end structure;
   an outer metallic sleeve surrounding the proximal end of the overhead electrical cable, the outer metallic sleeve having a compressed portion disposed over the proximal end of the overhead electrical cable; and
   a compression sheath structure comprising a plurality of aluminum cylindrical tubes, wherein each of the plurality of aluminum cylindrical tubes is disposed over a different fiber-reinforced composite rod to create a ductile barrier between each of the fiber-reinforced composite rods along a length of the conductive strands under the compressed portion, wherein the compression sheath structure does not extend substantially beyond the compressed portion of a distal end of the termination arrangement.

2. The termination arrangement recited in claim 1, wherein the individual fiber-reinforced composite rods comprise substantially continuous reinforcing fibers disposed within a binding matrix that extend along a length of the fiber-reinforced composite rods.

3. The termination arrangement recited in claim 2, wherein the binding matrix is a polymeric matrix.

4. The termination arrangement recited in claim 3, wherein the substantially continuous reinforcing fibers comprise carbon fibers.

5. The termination arrangement recited in claim 1, wherein the conductive strands comprise aluminum strands.

6. The termination arrangement recited in claim 5, wherein the conductive strands comprise hardened aluminum strands.

7. The termination arrangement recited in claim 1, wherein the plurality of individual fiber-reinforced composite rods comprises a central fiber-reinforced composite rod and two or more outer fiber-reinforced composite rods surrounding the central rod, and wherein two or more of the plurality of aluminum cylindrical tubes are each disposed over an end of an individual outer fiber-reinforced composite rod of the two or more outer fiber-reinforced composite rods.

8. The termination arrangement recited in claim 7, wherein one of the plurality of aluminum cylindrical tubes is disposed over an end of the central fiber-reinforced composite rod.

9. The termination arrangement recited in claim 1, wherein the plurality of aluminum cylindrical tubes are fabricated from an annealed aluminum.

10. The termination arrangement recited in claim 1, wherein each aluminum cylindrical tube of the plurality of aluminum cylindrical tubes has a thickness of at least about 2 mm and not greater than about 10 mm.

11. The termination arrangement recited in claim 1, wherein each aluminum cylindrical tube of the plurality of aluminum cylindrical tubes has a length of at least about 300 mm and not greater than about one meter.

12. The termination arrangement recited in claim 1, wherein the conductive strands are fabricated from a hardened aluminum alloy.

13. The termination arrangement recited in claim 1, wherein each aluminum cylindrical tube of the plurality of aluminum cylindrical tubes has an inner diameter that is approximately the same as the outer diameter of the individual fiber-reinforced composite rods.

14. The termination arrangement recited in claim 1, wherein each aluminum cylindrical tube of the plurality of aluminum cylindrical tubes comprises a longitudinal slot along the cylindrical tube.

15. The termination arrangement recited in claim 1, wherein the conductive strands comprise hardened aluminum strands.

16. A termination arrangement securing an overhead electrical cable to a dead-end structure, the overhead electrical cable having a composite strength member comprising a plurality of individual fiber-reinforced composite rods that are operatively combined to form the composite strength member and having conductive strands surrounding the composite strength member, the termination arrangement comprising:
    a connector anchoring the termination arrangement to the dead-end structure;
    an outer metallic sleeve surrounding the proximal end of the overhead electrical cable, the outer metallic sleeve having a compressed portion disposed over the proximal end of the overhead electrical cable; and
    a compression sheath structure comprising a plurality of aluminum cylindrical tubes, wherein each of the plurality of aluminum cylindrical tubes is disposed over a different fiber-reinforced composite rod to create a ductile barrier between each fiber-reinforced composite rod of the plurality of fiber-reinforced composite rods along at least a length of the conductive strands under the compressed portion of the outer metallic sleeve,
    wherein each aluminum cylindrical tube of the plurality of aluminum cylindrical tubes has an inner diameter that is approximately the same as an outer diameter of the individual fiber-reinforced composite rods,
    wherein the compression sheath structure does not extend substantially beyond the compressed portion of a distal end of the termination arrangement, and
    wherein the conductive strands comprise hardened aluminum strands.

* * * * *